(12) United States Patent
Naveena-Chandran et al.

(10) Patent No.: US 11,655,709 B2
(45) Date of Patent: May 23, 2023

(54) RESERVOIR CHARACTERIZATION WITH DIRECTIONAL PERMEABILITY

(71) Applicant: Halliburton Energy Services, Inc., Houston, TX (US)

(72) Inventors: Rohin Naveena-Chandran, Houston, TX (US); Edward Jeffrey Koon, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 17/006,479

(22) Filed: Aug. 28, 2020

(65) Prior Publication Data
US 2021/0238999 A1 Aug. 5, 2021

Related U.S. Application Data

(60) Provisional application No. 62/965,557, filed on Jan. 24, 2020.

(51) Int. Cl.
*E21B 49/00* (2006.01)
*E21B 47/002* (2012.01)
(Continued)

(52) U.S. Cl.
CPC .......... *E21B 49/00* (2013.01); *E21B 47/0025* (2020.05); *E21B 47/0228* (2020.05);
(Continued)

(58) Field of Classification Search
CPC ...... E21B 47/16; E21B 47/01; E21B 33/1246; E21B 47/085; E21B 49/00;
(Continued)

(56) References Cited

U.S. PATENT DOCUMENTS 4,924,187 A * 5/1990 Sprunt ................. G01N 27/041
324/376
5,335,542 A * 8/1994 Ramakrishnan .... E21B 33/1246
73/152.08
(Continued)

FOREIGN PATENT DOCUMENTS

EP 0950795 A2 10/1999

OTHER PUBLICATIONS

Yi Wang et al., "On Full-Tensor Permeabilities of Parous Media from Numerical Solutions of the Navier-Stokes Equation" ,Hindawi Publishing Corporation Advances in Mechanical Engineering vol. 2013, Article ID 137086, 11 pages (Year: 2013).*

(Continued)

*Primary Examiner* — Catherine T. Rastovski
*Assistant Examiner* — Kaleria Knox
(74) *Attorney, Agent, or Firm* — Benjamin Ford; Parker Justiss, P.C.

(57) ABSTRACT

The disclosure presents an apparatus and system to allow for multiple downhole sensors to be oriented at varying azimuthal angles to collect reservoir data across varying azimuthal directional arcs. In one aspect, two sensors can be attached to a downhole tool system, one being oriented azimuthally 90° different than the other sensor. In other aspects, a method and system are presented to utilize the collected reservoir data to compute a porosity anisotropy and permeability parameters. These parameters can be utilized to further derive reservoir characteristic parameters, such as a permeability ellipsoid that can identify the primary axis of drainage of the reservoir and the minimum axis of drainage of the reservoir. The derived reservoir characteristic parameters can be utilized to modify a well system operation plan, such as to improve the well system production over a time period.

25 Claims, 11 Drawing Sheets

(51) Int. Cl.
*E21B 47/0228* (2012.01)
*E21B 47/06* (2012.01)
*G01N 15/08* (2006.01)
*E21B 10/02* (2006.01)

(52) U.S. Cl.
CPC ............. *E21B 47/06* (2013.01); *G01N 15/08* (2013.01); *E21B 10/02* (2013.01)

(58) Field of Classification Search
CPC .. E21B 47/0025; E21B 47/0228; E21B 47/06; E21B 10/02; E21B 47/007; G06F 30/23; G01N 15/08; G01N 27/041; H03M 7/30; G01V 1/40; G01V 3/081
See application file for complete search history.

(56) References Cited

U.S. PATENT DOCUMENTS

| | | | | |
|---|---|---|---|---|
| 6,405,136 B1* | 6/2002 | Li | ............................ | H03M 7/30 |
| | | | | 702/9 |
| 6,655,458 B2* | 12/2003 | Kurkjian | ................. | E21B 47/01 |
| | | | | 175/97 |
| 7,126,340 B1* | 10/2006 | Ameen | ................... | G01V 3/081 |
| | | | | 324/377 |
| 9,599,737 B2* | 3/2017 | Conrad | .................... | G01V 1/40 |
| 9,927,544 B2* | 3/2018 | Huang | .................... | E21B 47/16 |
| 2008/0164063 A1* | 7/2008 | Grayson | ............... | E21B 47/007 |
| | | | | 175/45 |
| 2009/0254282 A1* | 10/2009 | Bespalov | ................. | G01V 3/20 |
| | | | | 702/7 |
| 2014/0368200 A1* | 12/2014 | Wang | ....................... | G01V 3/28 |
| | | | | 324/338 |
| 2014/0372095 A1* | 12/2014 | van der Zee | ........... | G06F 30/23 |
| | | | | 703/10 |
| 2018/0100950 A1* | 4/2018 | Yao | ........................ | E21B 47/085 |

OTHER PUBLICATIONS

Lang, et al.; "Permeability tensor of three-dimensional fractured porous rock and a comparison to trace map predictions"; AGU Publications; Journal of Geophysical Research: Solid Earth; 10.1002/2014JB011027; Feb. 7, 2014; 20 pgs.

Fanchi; "Directional Permeability"; SPE Reservoir Evaluation & Engineering; Jun. 2008; 4 pgs.

Noufal, et al.; "New Borehole Image Log Based Technique for Pore System Characterization Predicts Productive Intervals in a Tight Carbonate Reservoir in Abu Dhabi"; SPE International; Society of Petroleum Engineers; SPE-193281-MS; Nov. 12-15, 2018; 20 pgs.

* cited by examiner

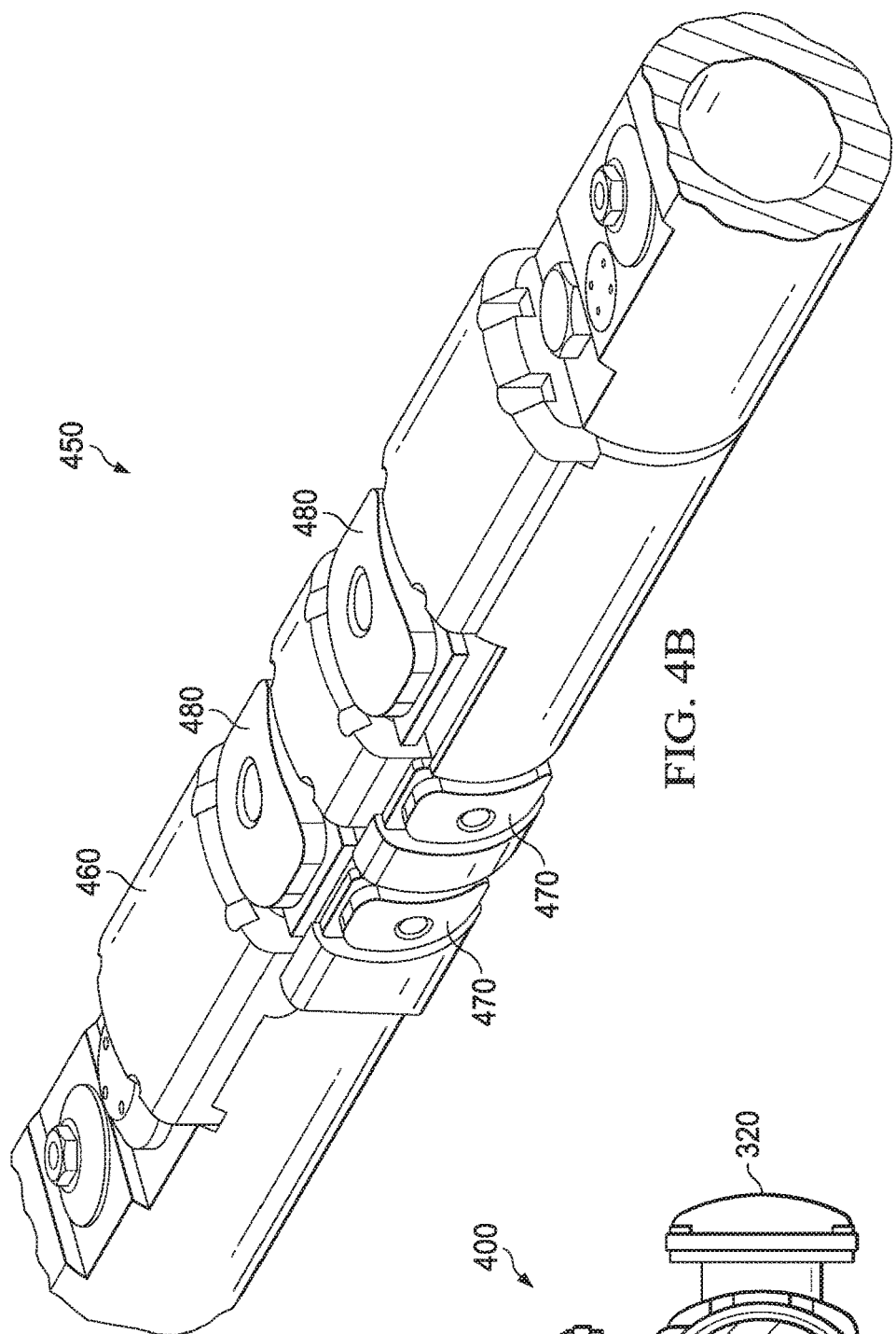
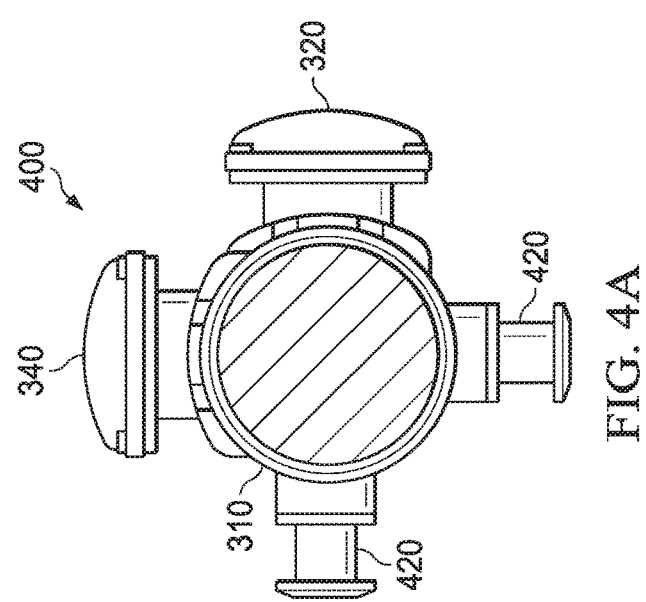
FIG. 4B
FIG. 4A

RESERVOIR CHARACTERIZATION WITH DIRECTIONAL PERMEABILITY

CROSS-REFERENCE TO RELATED APPLICATION

This application claims the benefit of U.S. Provisional Application Ser. No. 62/965,557, filed by Rohin Naveena-Chandran, et al. on Jan. 24, 2020, entitled "RESERVOIR CHARACTERIZATION WITH DIRECTIONAL PERMEABILITY," commonly assigned with this application and incorporated herein by reference in its entirety.

TECHNICAL FIELD

This application is directed, in general, to characterizing a reservoir and, more specifically, to identifying permeability and porosity characteristics of the reservoir.

BACKGROUND

In developing a hydrocarbon well system, operators can utilize information about how a reservoir within a subterranean formation behaves and reacts as the reservoir is subject to well system drilling, fracturing, production, and other activities. Understanding the permeability and porosity of the subterranean formation around the reservoir can assist the operator in modifying the well system operation plan, such as to minimize cost or maximize production. Conventional sensors have a limited azimuthal directional arc in which they can collect reservoir data. This can limit the resulting parameters that the operator can use in analyzing the reservoir characteristics.

SUMMARY

In one aspect, an apparatus is disclosed. In one embodiment the apparatus includes (1) a downhole tool assembly, capable of supporting one or more tools, supplying power to the tools, and providing communications between the tools and surface equipment, wherein the downhole tool assembly is utilized within a borehole of a well system, (2) a first tool, mechanically, electrically, and communicatively coupled to the downhole tool assembly, wherein the first tool includes a first sensor oriented at a first azimuthal angle, and (3) a second tool, mechanically, electrically, and communicatively coupled to the first tool or to the downhole tool assembly, wherein the second tool includes a second sensor and the second sensor is oriented at a second azimuthal angle, and wherein the first sensor and the second sensor can measure one or more characteristics of a reservoir.

In a second aspect, a downhole assembly is disclosed. In one embodiment the downhole assembly includes (1) a permeability tool, operable to obtain permeability parameters of a borehole of a well system from at least two different azimuthal angles with respect to an orientation of the permeability tool, and (2) a directional tool, operable to indicate the orientation of the permeability tool.

In a third aspect, a method to determine reservoir characteristic parameters is disclosed. In one embodiment the method includes (1) collecting imaging data utilizing an imaging resistivity sensor located within a borehole of a well system, (2) determining a measuring point along the borehole utilizing the imaging data, (3) positioning a first sensor at a first orientation at the measuring point and collecting first sensor data, (4) moving a second sensor at a second orientation to the measuring point and collecting second sensor data, (5) computing a permeability tensor utilizing the first sensor data, the second sensor data, and the imaging data, (6) calculating a porosity anisotropy utilizing the permeability tensor, the first sensor data, the second sensor data, and the imaging data, and (7) scaling the permeability tensor utilizing the porosity anisotropy oriented to a maximum fracture porosity, wherein the permeability tensor, the porosity anisotropy, the imaging data, the first sensor data, and the second sensor data are the reservoir characteristic parameters.

In a fourth aspect, a system is disclosed. In one embodiment the system includes (1) a downhole tool, located in a borehole of a well system, capable of mechanically, electrically, and communicatively supporting a set of one or more sensors, (2) a first sensor, in the set of one or more sensors, capable to collect sensor data of a reservoir at a first sensor location, and (3) a reservoir characteristic analyzer, capable of sending instructions and parameters to the downhole tool and the set of one or more sensors, receiving the sensor data, computing a permeability tensor, calculating a porosity anisotropy, scaling the permeability tensor, and generating a reservoir drainage parameter.

BRIEF DESCRIPTION

Reference is now made to the following descriptions taken in conjunction with the accompanying drawings, in which:

FIG. 4A is an illustration of a diagram of an example cross-sectional view of the oriented probe of FIG. 3;

FIG. 4B is an illustration of a diagram of an example inline probe system;

DETAILED DESCRIPTION

Figure 1:
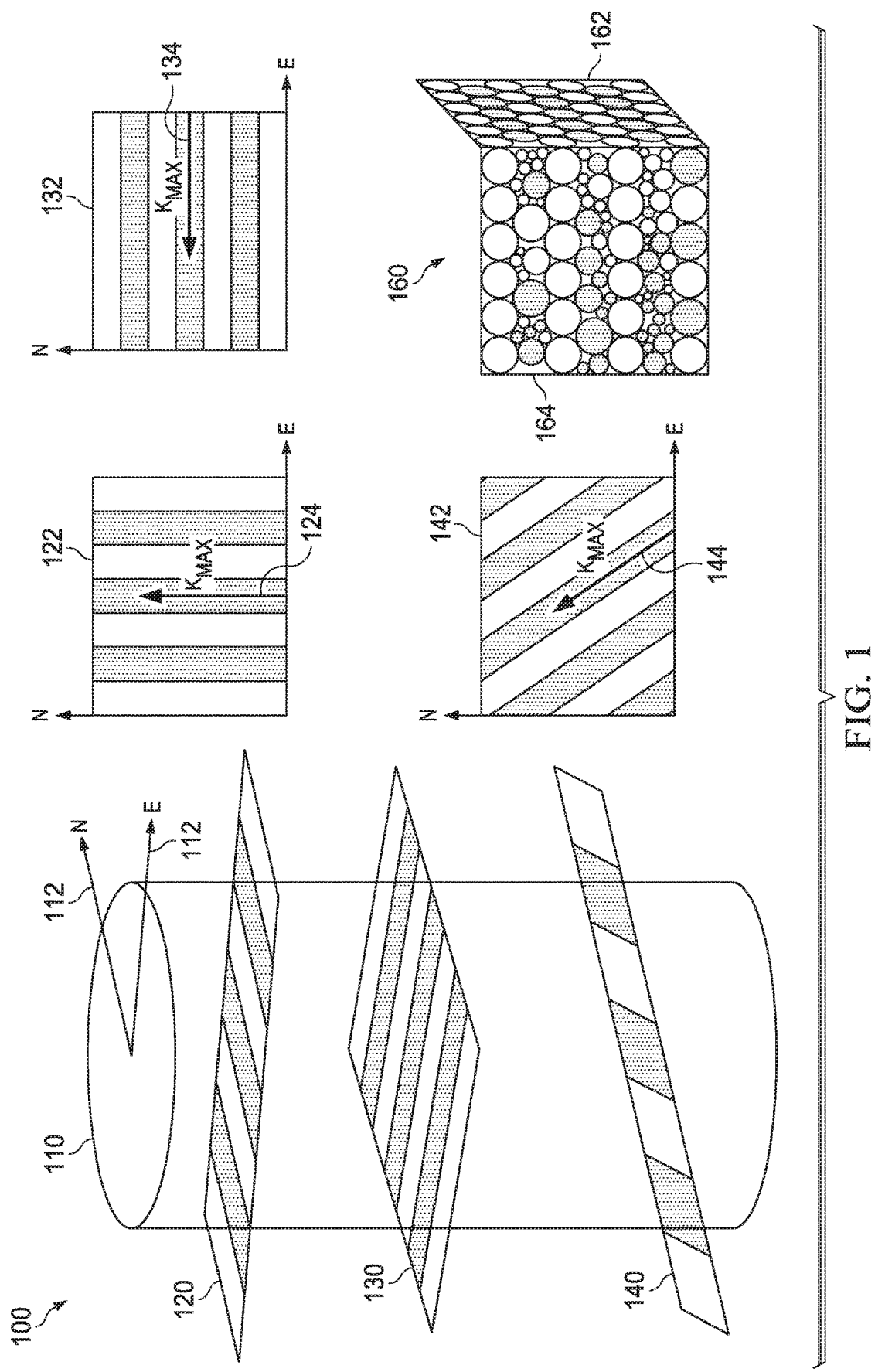
FIG. 1 is an illustration of a diagram of example permeability flows.

In the hydrocarbon production industry, it can be beneficial to understand characteristics of how the hydrocarbon reservoir behaves under various conditions and at various locations within the reservoir. The hydrocarbon reservoir can be located within a subterranean formation in various environments, such as deep water and on a land surface. The well system used to access the reservoir can be of various types of well systems, such as drilling, logging while drilling, measuring while drilling, seismic while drilling, hydraulic fracturing, production, intercept, relief, and other well system types. The well system can be located at the surface of the land or water and extend down through a riser or borehole into the subterranean formation and the reservoir area.

Reservoir characteristic parameters can be utilized to determine how a hydrocarbon well system will perform and how satisfactory hydrocarbons will flow during a production stage of the well system. Reservoir characteristics, represented as parameters in the disclosed processes, can assist users, such as well system operators and engineers, in developing the reservoir to improve productivity over a time period, thereby increasing the well system production or decreasing well system costs to improve the well system profitability. For example, the reservoir characteristic parameters can include the permeability, porosity, resistivity, and other characteristic parameters. The reservoir characteristic parameters can show where the hydrocarbon zones are located within the various subterranean formations of the well system and how porous the rock, e.g., subterranean formation, is to enable the hydrocarbons to flow.

The permeability reservoir characteristic parameter can be used to indicate how smooth or how easy the hydrocarbon fluids will flow. Over time, as the reservoir is drained, the reservoir characteristic parameters can change. Periodically, new data can be collected from the changing environment within the reservoir, and then processed and analyzed to update the reservoir characteristic parameters. For example, the permeability characteristic parameter at the onset of well system production can be at a high permeability value. As the reservoir is drained, certain sections of the well system can exhibit reduced permeability values as compared to the onset permeability value.

When developing well systems in different environments, such as unconventional and deep-water environments, the value of the permeability characteristic parameter as a contributor to the well system operation plan can increase. In a deep-water environment, higher permeability can be indicative of a good flowing well system. In unconventional well systems, there can be a highly fractured reservoir and those fractures can contribute to the permeability of the well system. The well system operators can look for these permeable fractures for further development. This disclosure can give the well system operator the ability to identify, in advance, characterization of permeability in the reservoir for unconventional, deep-water, and other well system environments. In a development environment, permeability can vary across thief zones. In carbonate environments, there can be geological heterogeneity that can affect permeability measurements.

Conventionally, probes and sensors used to determine reservoir characteristic parameters can collect data in one azimuthal directional arc. For example, a pressure probe, a nuclear magnetic resonance sensor (NMR), and a rotary coring bit collect data in a single azimuthal directional arc from the downhole tool as inserted into the borehole of a well system. Other tools, such as imaging resistivity sensors, can collect data in a broader azimuthal directional arc, such as 360° (degrees).

One aspect of this disclosure describes an apparatus and system that can be configured to have one sensor or probe that can be moved into various azimuthal orientations and borehole locations. Another aspect can have more than one sensor or probe, each oriented at a different azimuthal angle, and can be moved into a selected location within the borehole. The azimuthal orientation can be such that one sensor or probe can be designated as the azimuthal x-axis and a second sensor or probe can be designated as the azimuthal y-axis. Other orientations, e.g., azimuthal angles, can be utilized and the collected data can be transformed to a designated coordinate system, such as the coordinate system used by an imaging resistivity sensor, a coordinate system used by the downhole tool to which the sensor or probes are attached, or another coordinate system, such as an initial or original coordinate system. Using the multiple sensors or probes in the different orientations can allow the collection of permeability data in the x and y azimuthal directions, thereby improving the accuracy of the computed parameters. In other aspects, additional sensors and probes can be utilized enabling the collection of data in azimuthal directional arcs in addition to the x and y vectors.

A relationship can be determined between the permeability parameters and the porosity parameters, where the parameters are derived from the collected data. The porousness of a subterranean formation of a reservoir can contribute to the amount of permeability of the reservoir. Using this determination, another aspect of this disclosure demonstrates a method and a system that can associate porosity and permeability parameters to derive additional reservoir characteristic parameters. For example, a permeability ellipsoid data representation and a porosity anisotropy can be developed, as well as other reservoir characteristics.

These reservoir characteristic parameters can be associated with the collected imaging resistivity data. The imaging resistivity sensors can collect data on porosity at a location within the reservoir by using, for example, button pad sensors. By utilizing the porosity data collected from the button pads with the directional permeability data collected by the other sensors or probes, the permeability characteristic parameter can be transposed onto the imaging resistivity sensor's collected data to achieve a larger, e.g., a broader azimuthal, directional arc for the collected permeability data.

The larger directional arc can improve the accuracy of the derived reservoir characteristic parameters. Thus, the permeability reservoir characteristic parameter can be utilized by the well system operators to identify in which direction the reservoir drains faster, e.g., the primary drainage flow direction. The drainage flow direction can be used in follow-on stages of the well system operation plan to improving the well system efficiency, such as determining angle drilling, well intercepts, hydraulic fracturing (HF) treatments, the use of various muds and fluids pumped downhole, and determining other well system operations.

Turning now to the figures, FIG. 1 is an illustration of a diagram of example permeability flows 100. Borehole 110 is shown in a vertical orientation, and compass direction coordinate system 112 is overlaid borehole 110. Plane 120 is shown as oriented in parallel to the North direction of coordinate system 112. Plane 130 is shown as oriented parallel to the East direction of coordinate system 112. Plane 140 is shown as oriented slanted to coordinate system 112, representing a dip bed.

Plane 120, plane 130, and plane 140 are examples of a clastic subterranean formation with sand and shale layers. Each plane is located at a point within the borehole where sensor readings have been taken and permeability characteristics have been derived. These locations can be referred to as measuring points, such as a pressure point, within the borehole. Additional measuring points can be identified within the borehole as well. The measuring points can be spaced at various distances apart and can be located at key points within the borehole, such as at points where the subterranean formation characteristics change, e.g., at rock layer boundaries.

Plane 120 is shown in a two-dimensional (2D) graph 122. Graph 122 demonstrates the permeability flow 124 (represented by $K_{MAX}$) as oriented with the North directional coordinates. Plane 130 is shown in a 2D graph 132. Graph 132 demonstrates the permeability flow 134 is oriented with the West directional coordinates. Plane 140 is shown in a 2D graph 142. Graph 142 demonstrates the permeability flow 144 is oriented diagonally to the compass coordinate system 112.

Three-dimensional (3D) graph 160 represents a carbonate type of subterranean formation. Direction 162, where the porosity is aligned, demonstrates the direction of maximum permeability drainage. Direction 164, where the porosity is dissimilar, demonstrates the direction of minimum permeability drainage. Maximum permeability occurs in parallel beds with maximum porosity or fractured porosity in anisotropic formations. The permeability is proportional to the porosity as shown in Equation 1.

Equation 1: Example Permeability and Porosity Proportions $$K \propto \varphi^n$$

where K is the permeability,
φ is the porosity, and
n is a factor derived from the geology of the subterranean formation where the reservoir exists and is a power law relationship used for reservoir simulators.

Figure 2:
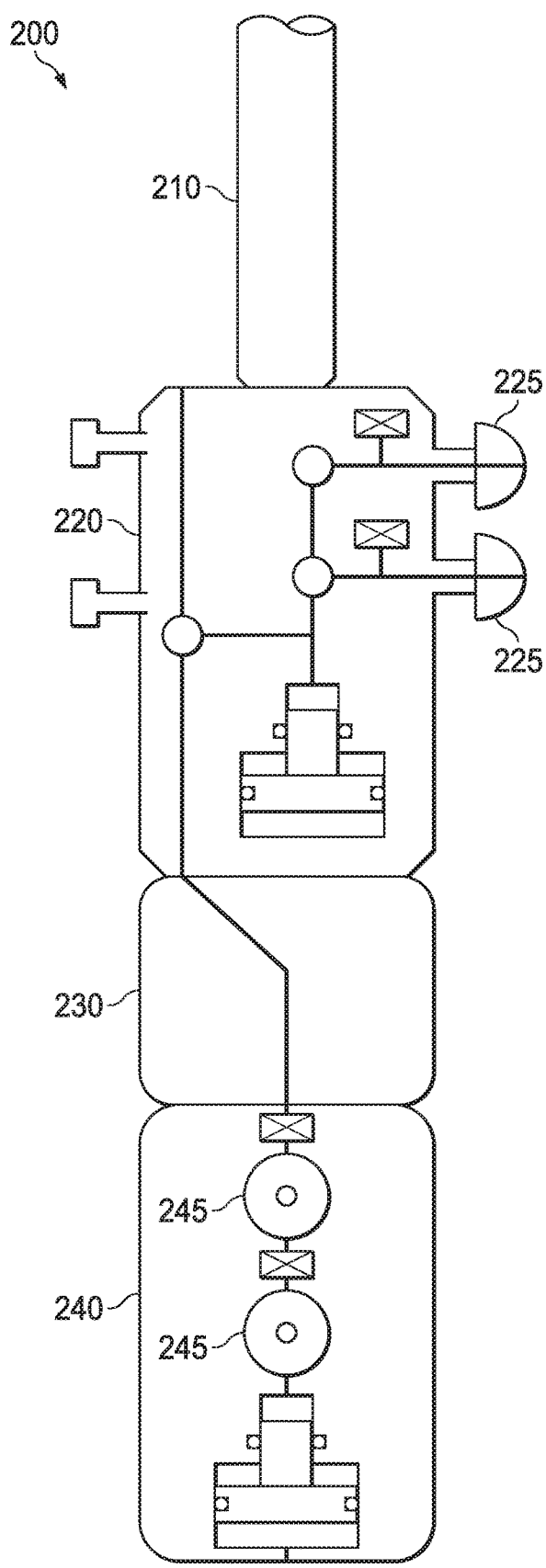
FIG. 2 is an illustration of a diagram of an example schematic of a downhole tool with two sensor subs.
Figure 9A:
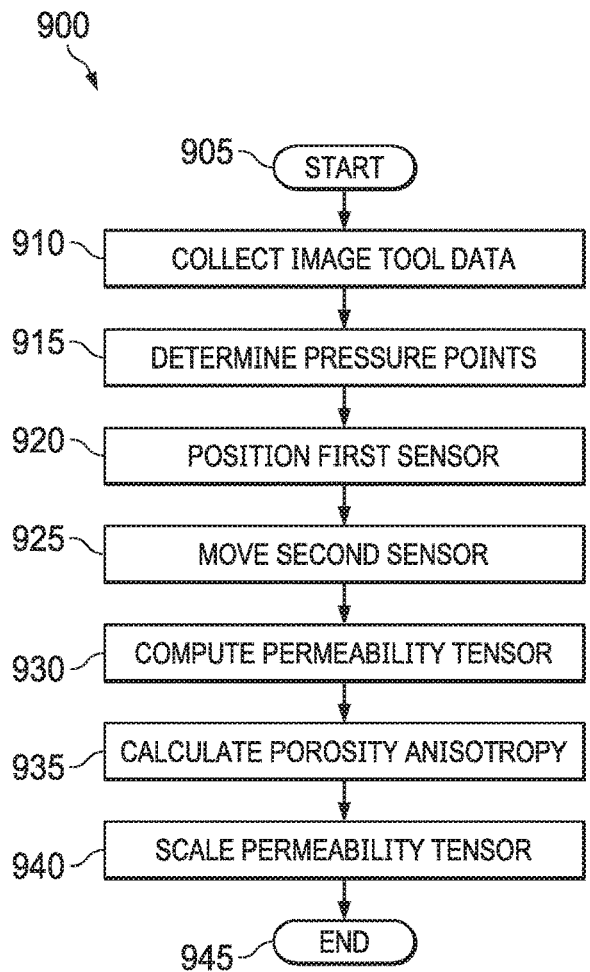
FIG. 9A is an illustration of a flow diagram of an example method to derive reservoir characteristics.
Figure 10:
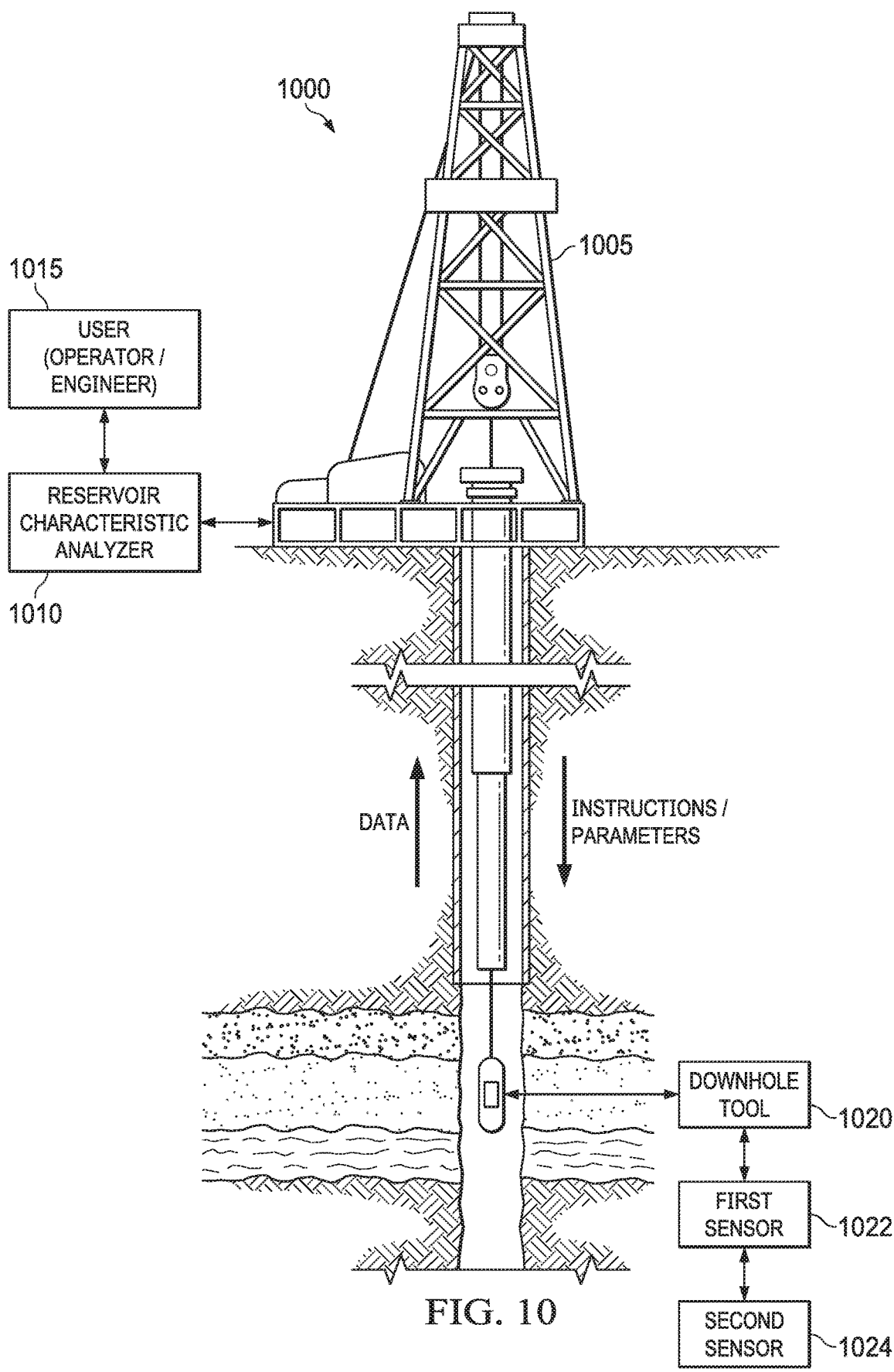
FIG. 10 is an illustration of a block diagram of an example reservoir characteristic deriver system.

FIG. 2 is an illustration of a diagram of an example schematic of a downhole tool 200 with two sensor subs, such as downhole tool system 1020, first sensor 1022, and second sensor 1024 of reservoir characteristic deriver system 1000 of FIG. 10. Downhole tool 200 can be used by the methods and processes described herein to collect reservoir characteristic data that can be used to derive porosity and permeability reservoir characteristic parameters, such as using method 900 of FIG. 9A. Downhole tool 200 can be a downhole tool assembly, e.g., a permeability tool, and is capable of being mechanically, electrically, and communicatively coupled to other downhole tools and surface equipment.

Downhole tool 200 can be lowered into position within a borehole by a wireline attached to a directional tool 210. In other aspects, the wireline can be a drill string, a cable, a pipe, a tube, and other support mechanisms. Directional tool 210 can provide power to other coupled tools, and provide communications between sensors, tools, and surface equipment, such as controllers, e.g., well site controllers. Attached to directional tool 210 is a first tool 220 which includes a first sensor 225. First tool 220 is mechanically, electrically, and communicatively coupled to directional tool 210. Attached below first tool 220 is a sub 230. Attached below sub 230 is a second tool 240 which includes second sensor 245. Second tool 240 is mechanically, electrically, and communicatively coupled to sub 230, which is also coupled to first tool 220.

Sub 230 allows for the second tool 240 to be oriented at an offset azimuthal angle from first tool 220. In this demonstration, second tool 240 is offset 90.0° from first tool 220. The offset, e.g., offset azimuthal angle, can vary, such as using 45.0°, 22.5°, or other degrees within the range of 0.0° to 180.0°, such as 15.0°, 22.5°, 30.0°, 45°, 60°, 67.5°, 75°, 90°, 120°, or 180°. The orientation of first sensor 225 and second sensor 245 can be related by defining first sensor 225 as being in the x-axis direction and second sensor 245 as being in the y-axis direction. This relationship between sensors is used in FIGS. 5, 6, 7, and 8. The orientation of the sensors can vary from what is described herein, and the appropriate orientation transformations can be applied to align the differing coordinate systems used.

First sensor 225 and second sensor 245 can be various types of sensors, for example, a pressure probe, an NMR sensor, or a rotary coring bit. In some aspects, second sensor 245 can be located in first tool 220, and second tool 240 and sub 230 can be absent from downhole tool 200. In other aspects, first sensor 225 can be used in place of second sensor 245, such as when using a powered sub to orient first tool 220 at the initial and offset azimuthal angle positions. In this aspect, sub 230, second tool 240, and second sensor 245 are not part of downhole tool 200. In some aspects, second tool 240 can be part of first tool 220. In some aspects, first tool 220 and second tool 240 can be integrated into one or more other tools.

In other aspects, additional sensor tools can be included in downhole tool 200. For example, one or more sensor tools can be included in the set of additional tools, where each sensor tool can be positioned at a different azimuthal angle from the first tool 220. For example, three sensors can be utilized at offset azimuthal angles of 120°, or four sensors can be utilized at offset azimuthal angles of 90°. An increase in the number of sensors can improve the accuracy of the reservoir data collected at a cost of additional equipment and processing time. Preferably, there are one to six additional sensor tools in the set of additional tools. For example, if the additional sensors are located in separate tools, downhole tool 200 can be moved to locate each sensor at the measuring point within the borehole prior to the sensor collecting data. When pressure probes are used, this can add several hours of moving and processing time for each additional sensor probe used since pressure tests can be 6 to 12 hours long. In another example, multiple sensors can be located in the same downhole tool which can allow each sensor to collect data at the measuring point at, or nearly at, the same time period.

Figure 3:
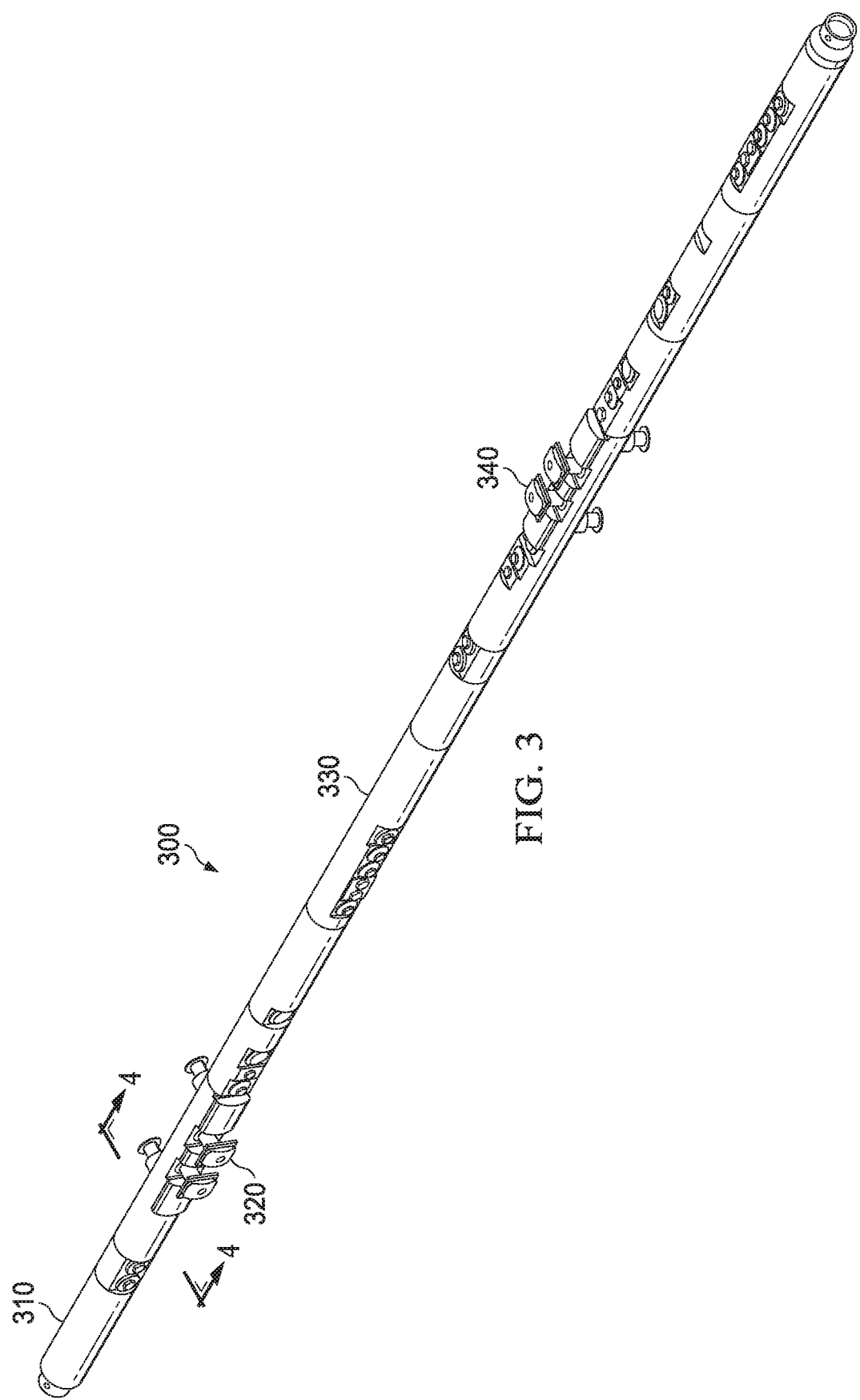
FIG. 3 is an illustration of a diagram of an example oriented probe system with three subs.

FIG. 3 is an illustration of a diagram of an example oriented probe system 300 with three subs. Oriented probe system 300 can be downhole tool 200 and used in reservoir characteristic deriver system 1000 on FIG. 10. Oriented probe system 300 includes a downhole tool 310 with an attached first tool 320 with a first sensor system, a sub 330, and a second tool 340 with a second sensor system. Sub 330 allows for second tool 340 to be oriented at a different offset azimuthal angle from that of first tool 320. The first tool 320 can be oriented at a first azimuthal angle and the second tool 340 can be oriented at a second azimuthal angle, such as at a 90° offset as shown in this example.

Cross-section 4 indicates additional detail as described in FIG. 4A. Oriented probe system 300, in this example diagram, is approximately 25 feet long, and can vary in length with the tools used and the number of sensors attached.

FIG. 4A is an illustration of a diagram of an example cross-sectional view 400 of oriented probe system 300 of FIG. 3. Cross-sectional view 400 shows downhole tool 310 assembly with first tool 320 sensors and second tool 340 sensors oriented at 90.0° from each other. In this view, first tool 320 sensors are oriented in the x-axis direction, and second tool 340 sensors are oriented in the y-axis direction.

Also included are stabilizers 420. Downhole tool 310 can be of various diameters, for example, four- and three-quarter inches.

FIG. 4B is an illustration of a diagram of an example inline probe system 450. Inline probe system 450 can be downhole tool 200 and used in reservoir characteristic deriver system 1000 on FIG. 10. Inline probe system 450 includes a downhole tool 460 that combines probes 470 of a first tool and probes 480 of a second tool. In one aspect, probes 470 can be inline probes in an x-axis orientation, e.g., a first azimuthal angle, and include a pressure gauge. Probes 480 can be inline probes in a y-axis orientation, e.g., a second azimuthal angle, and include a pressure gauge. Inline probe system 450 shows probes 470 offset at approximately a 90° offset from probes 480, though other offset angles can be utilized.

Figure 5:
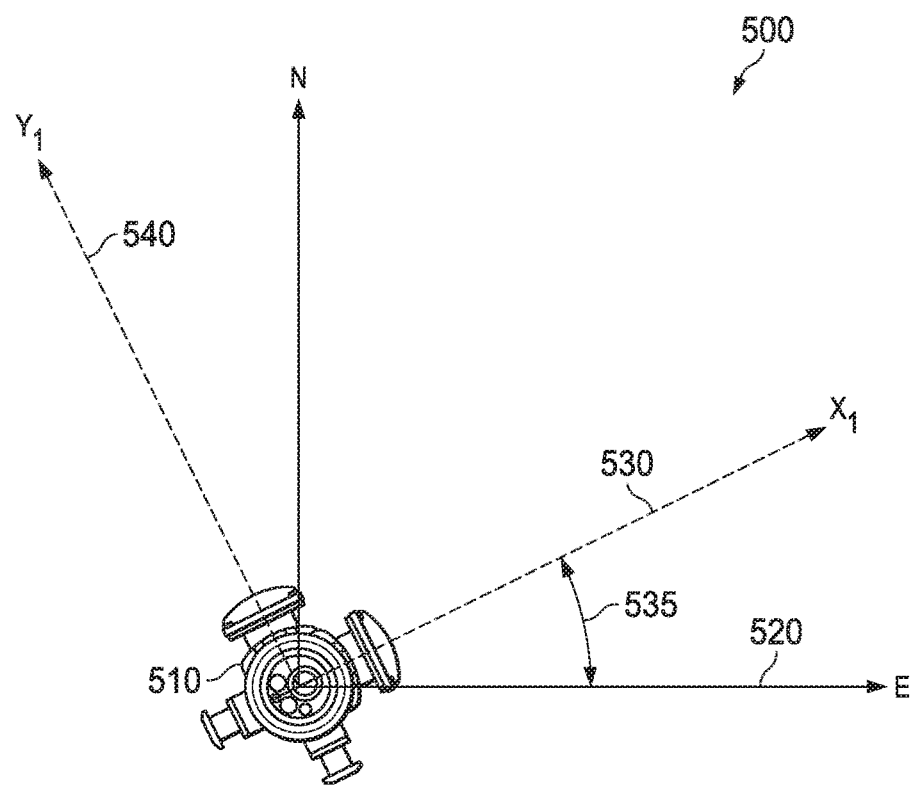
FIG. 5 is an illustration of a diagram of an example coordinate system of an oriented probe.

FIG. 5 is an illustration of a diagram of an example coordinate system 500 of an oriented probe 510, such as oriented probe system 300. Coordinate system 500 has directional arrows 520 determined according to the compass directions. Other coordinate systems can be utilized for directional arrows 520. Oriented probe 510 has the first sensors oriented along an x projection 530 and the second sensors oriented along a y projection 540. An angle θ 535 is calculated, which is the permeability plane with an offset azimuthal angle of θ.

Figure 6:
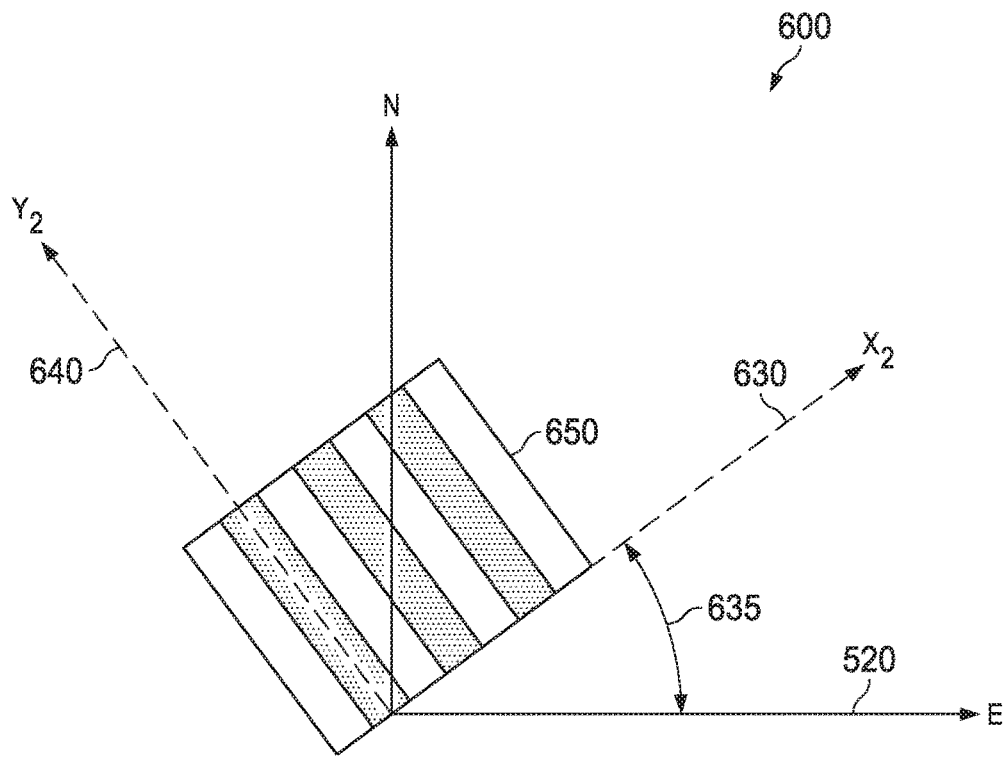
FIG. 6 is an illustration of a diagram of an example coordinate system of an imaging tool.

FIG. 6 is an illustration of a diagram of an example coordinate system 600 of an imaging tool. Coordinate system 600 has directional arrows 520 determined according to the compass directions, similar to coordinate system 500. Other coordinate systems can be utilized for directional arrows 520. The imaging resistivity sensors can be oriented at a different offset azimuthal angle from the oriented probe 510. A permeability plane 650, as represented by the data collected from the imaging resistivity sensors, has an x projection 630 that is offset from directional arrows 520 by an angle α 635. Angle α is the offset azimuthal angle from the coordinate system used for directional arrows 520 and corresponds to the bedding planes and maximum fracture porosity. A y projection 640 indicates the direction of maximum permeability and porosity.

Figure 7:
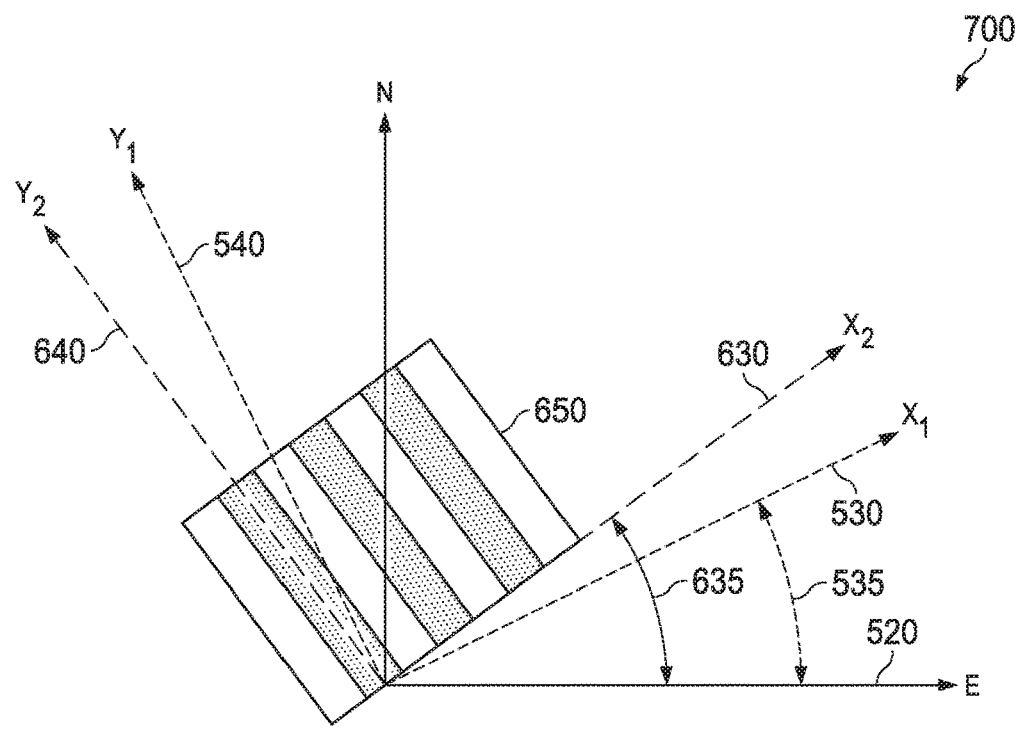
FIG. 7 is an illustration of a diagram of an example coordinate system demonstrating scaling a permeability tensor and a porosity anisotropy derivation.

FIG. 7 is an illustration of a diagram of an example coordinate system 700 demonstrating scaling a permeability tensor and a porosity anisotropy derivation. Using the similar directional arrows 520, the coordinate system 500 and coordinate system 600 are overlaid. The permeability plane 650 is overlaid directional arrows 520. Angle θ 535 and angle α 635 are overlaid as well. X projection 530 can be represented by permeability in the tangential direction ($K_T$) and x projection 630 can be represented by $K_{T-\alpha}$, where $_T$ is the transverse permeability parameters as collected by sensors, such as oriented probe 510. Y projection 540 can be represented by permeability in the maximum direction ($K_{MAX}$) and y projection 640 can be represented by $K_{MAX-\alpha}$. The direction of maximum porosity, i.e., $\phi_{MAX}$, is roughly aligned with y projection 640. The direction of minimum porosity, i.e., $\phi_{MIN}$, is roughly aligned with x projection 630.

This orientation of the collected imaging and sensor data can allow for the computing of additional reservoir characteristic parameters, such as scaling a permeability tensor according to the porosity anisotropy. The scaling factor can be determined using Equations 2A-2D since permeability is proportional to the porosity as shown in Equation 1.

Equation 2A: Example Derivation of a Porosity Anisotropy Scaling Factor Using a Pressure Probe $$\left(\frac{\phi_{MAX}}{\phi_{MIN}}\right)^n = \frac{K_{MAX-\alpha}}{K_{T-\alpha}} = \varepsilon\frac{K_{MAX}}{K_T}$$

where ε is the scaling factor. Permeability can be derived from a mobility parameter, such as shown in Equation 2B.

Equation 2B: Example Permeability from a Mobility Parameter $$M = \frac{K}{\mu}$$

where M is the mobility parameter,
K is the permeability, and
μ is the viscosity of the reservoir fluid.

Equation 2C: Example Derivation of a Porosity Anisotropy Scaling Factor Using an NMR Sensor $$\left(\frac{R_T}{R_{MAX}}\right)\left(\frac{r^2_{MAX}}{r^2_T}\right) = \sigma\frac{K_{MAX}}{K_T}$$

where r is the pore throat size, and
σ is the proportion used to transform NMR sensor parameters to the imaging coordinate system.

Equation 2D: Example Derivation of a Porosity Anisotropy Scaling Factor Using a Rotary Coring Bit $$\left(\frac{\phi_{MAX}}{\phi_T}\right)^n = \gamma\frac{K_{MAX}}{K_T}$$

(for digital core type of rotary coring data)

$$\left(\frac{r^2_{MAX}}{r^2_T}\right) \propto \gamma\frac{K_{MAX}}{K_T}$$

(for pore throat anisotropy)
where γ is the proportion used to transform rotary coring bit parameters to the imaging coordinate system.

A relationship between the permeability, as identified by the imaging tool and the oriented probe, can be defined as shown in Equation 3.

Equation 3: Example Relationship Between Imaging Tool and Various Oriented Probes for Permeability $$K_{imaging} = \varepsilon K_{pressure\ probe} = \sigma K_{NMR} = \gamma R_{rotary\ coring}$$

where ε is the proportion used to transform pressure probe parameters ($K_{pressure\ probe}$) to the imaging coordinate system,
σ is the proportion used to transform NMR sensor parameters ($K_{NMR}$) to the imaging coordinate system, and
γ is the proportion used to transform rotary coring bit parameters ($K_{rotary\ coring}$) to the imaging coordinate system.

Equation 4 demonstrates an inverse relationship of the imaging resistivity parameters as derived from the collected imaging data.

Equation 4: Example Inverse Relationship of $K_{imaging}$ $$K_{imaging}^{-1} * K_{imaging} = 1$$

Equations 2, 3, and 4 can be used to solve for $K_{MAX-\alpha}$ (the maximum permeability oriented to the bed or maximum fracture porosity) and $K_{T-\alpha}$ (the transverse permeability oriented to the bed or the minimum fracture porosity). These elements of the permeability tensor are transformed from the oriented probe coordinate system to the imaging coordinate system. The permeability tensor can be defined as shown in Equation 5.

Equation 5: Example Permeability Tensor $$K = \begin{pmatrix} K_T & 0 \\ 0 & K_{MAX} \end{pmatrix}$$

The permeability tensor can be transformed to a different coordinate system where the diagonal elements are non-zero by applying a similarity transformation to the permeability tensor. Using the 2D example as shown in Equation 5, Equation 6 demonstrates the transformation process.

Equation 6: Example Permeability Transformation Process Between Two Coordinate Systems is Described by:

$$\begin{bmatrix} x_2 \\ y_2 \end{bmatrix} = \begin{bmatrix} \cos\varphi & \sin\varphi \\ -\sin\varphi & \cos\varphi \end{bmatrix} \begin{bmatrix} x_1 \\ y_1 \end{bmatrix}$$

$$\underline{K} = \begin{bmatrix} K_{xx} & K_{xy} \\ K_{yx} & K_{yy} \end{bmatrix}$$

$K_{xx} = K_T \cos^2\varphi + K_{MAX} \sin^2\varphi$ $K_{xy} = K_T \cos\varphi \sin\varphi + K_{MAX} \cos\varphi \sin\varphi$ $K_{yx} = K_T \cos\varphi \sin\varphi + K_{MAX} \cos\varphi \sin\varphi$ $K_{yy} = K_T \sin^2\varphi + K_{MAX} \cos^2\varphi$ where K is the transformed permeability tensor,
φ is the rotation angle of the transformation, $$\begin{bmatrix} x_1 \\ y_1 \end{bmatrix}$$

is one coordinate system, and $$\begin{bmatrix} x_2 \\ y_2 \end{bmatrix}$$

is a second coordinate system.

Coordinate system 700 can also illustrate an example porosity anisotropy derivation, which is related to the imaging sensor button pad density parameters. X projection 630 indicates the direction of minimum porosity and y projection 640 indicates the direction of maximum porosity. Conventionally, the porosity for an individual button pad can be represented by Equation 7.

Equation 7: Example Porosity Derivation for an Imaging Sensor Button Pad $$\phi_i = \phi_{ext}(R_{ext} * C_i)^{\frac{1}{m}}$$

where $\phi_i$ is the derived button pad porosity for button pad i,
$\phi_{ext}$ is the porosity from conventional logs,
$R_{ext}$ is the shallow resistivity from conventional logs,
$C_i$ is the conductivity of each button from the imaging sensor, and m is the Archie cementation exponent.

From Equation 7, porosity anisotropy can be further derived since the total porosity is equal to the sum of each button pad porosity parameter, such as $\phi = \Sigma \phi_i$. A relationship between the maximum and minimum porosities can be defined as shown in Equation 8.

Equation 8: Example Relationship of Maximum and Minimum Porosities at a Location $$\frac{\phi_{MAX}}{\phi_{MIN}} = \frac{\phi_{ext} * R_{ext}^{1/m} * \sum C_{MAX}^{1/m}}{\phi_{ext} * R_{ext}^{1/m} * \sum C_{MIN}^{1/m}}$$

where $C_{MAX}$ is the button pad conductivity in the maximum porosity direction, and
$C_{MIN}$ is the button pad conductivity in the minimum porosity direction.

The porosity anisotropy derivation can be further specified for the type of wellbore mud being used in the well system. Typically, a water-based mud and an oil-based mud can be utilized. Equation 9 shows a water-based mud derivation and Equation 10 shows an oil-based mud derivation.

Equation 9: Example Porosity Anisotropy Derivation for Water-Based Mud $$\frac{\phi_{MAX}}{\phi_{MIN}} = \frac{\sum C_{MAX}^{1/m}}{\sum C_{MIN}^{1/m}}$$

where C is the button pad conductivity in a water-based mud imager.

Equation 10: Example Porosity Anisotropy Derivation for Oil-Based Mud $$\frac{\phi_{MAX}}{\phi_{MIN}} = \frac{\sum \left(\frac{1}{R_{MAX}}\right)^{1/m}}{\sum \left(\frac{1}{R_{MIN}}\right)^{1/m}}$$

where R is the button pad resistivity in an oil-based mud imager.

Figure 8:
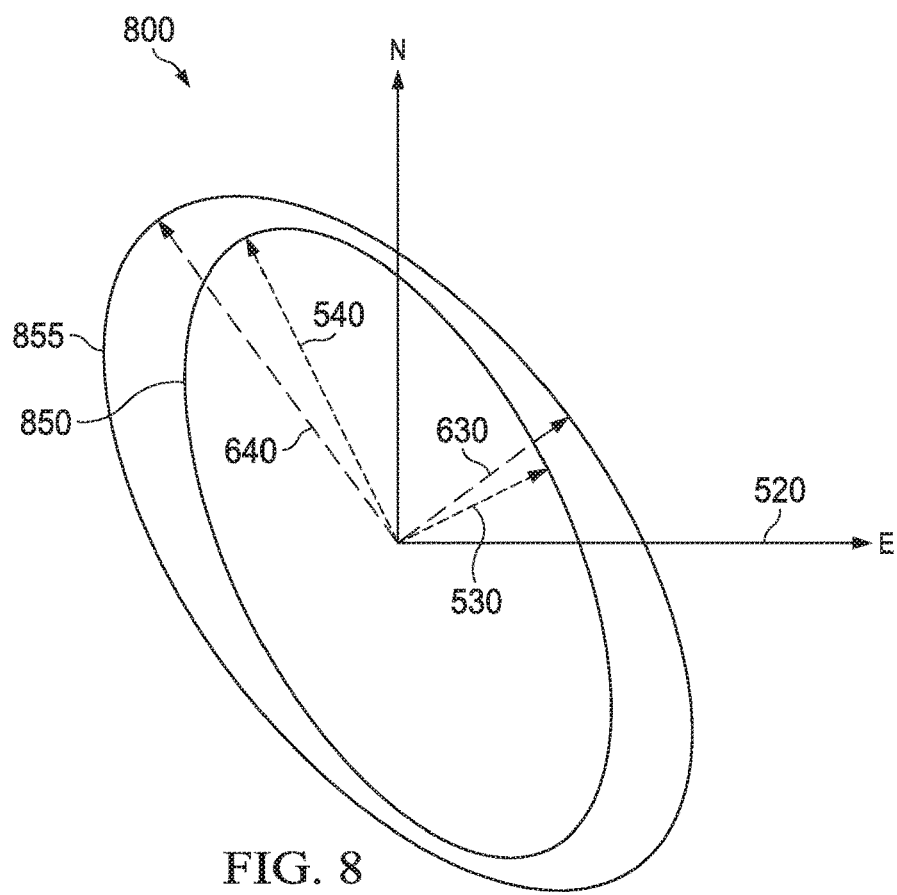
FIG. 8 is an illustration of a diagram of an example coordinate system demonstrating two permeability ellipsoids.

FIG. 8 is an illustration of a diagram of an example coordinate system 800 demonstrating two permeability ellipsoids, and is similar to coordinate system 500, coordinate system 600, and coordinate system 700. The permeability ellipsoids can help determine the maximum reservoir drainage direction and the minimum reservoir drainage direction, collectively, the reservoir drainage parameter. Understanding how the reservoir drains can be utilized as inputs into the well system operation plan to improve the production of the well system. The permeability, porosity, and permeability ellipsoid parameters can be derived at each measuring point identified within the borehole to generate a 3D model of reservoir drainage.

Permeability ellipsoid 850 can be defined by a primary axis, such as y projection 540, and a secondary axis, such as x projection 530. Permeability ellipsoid 855 can be defined by a primary axis, such as y projection 640, and a secondary axis, such as x projection 630. The primary axis indicates the axis of maximum reservoir drainage and the secondary axis indicates the axis of minimum reservoir drainage. These ellipsoids are displayed over the depth axis representing various depths of the wellbore. Permeability ellipsoid 850 is aligned with the probe coordinates, and permeability ellipsoid 855 is aligned with the imaging coordinates.

Coordinate system 500, coordinate system 600, coordinate system 700, and coordinate system 800 are visual representations to demonstrate the principles of this disclosure. The implementation of the methods of this disclosure can be by a computing system, such as reservoir characteristic deriver system 1000, where the various coordinate systems are represented as data elements of the system.

FIG. 9A is an illustration of a flow diagram of an example method 900 to derive reservoir characteristics. Method 900 can implement the equations as described to determine the direction of maximum and minimum reservoir drainage. Method 900 can be performed, for example, by reservoir characteristic deriver system 1000 of FIG. 10. Method 900 starts at a step 905 and proceeds to a step 910.

In step 910, an imaging resistivity sensor can be utilized to collect subterranean formation data at one or more designated locations within a borehole of a well system. In a step 915, measuring points, e.g., locations within the borehole, can be identified using the data from the imaging resistivity sensor.

In a step 920, a first sensor can be positioned at one measuring point. The first sensor can be part of the downhole tool system that includes the imaging resistivity sensor or it can be part of a separate downhole tool system, for example, oriented probe system 300. The first sensor can be a pressure probe, an NMR sensor, a rotary coring bit, or another type of sensor. The first sensor can collect directional data on the subterranean formation and reservoir at the measuring point, as well as other reservoir characteristic parameters. For example, the reservoir characteristic parameters can include pressure $P_x$, mobility $M_x$, and permeability $R_x$ in the direction of the first sensor orientation. In some aspects, the first sensor can be coupled to a sub with an orienting wheel system to orient the first sensor to the high side of the borehole. The high side of the borehole can be identified from the imaging data collected in step 910.

Proceeding to a step 925, a second sensor can be moved into position at the measuring point. The second sensor should be of the same type as the first sensor and can collect reservoir characteristic parameters, for example, pressure $P_y$, mobility $M_y$, and permeability $R_y$ in the direction of the second sensor orientation. The second sensor is positioned at an offset azimuthal angle from the first sensor, for example, 90° of offset. In other aspects, the offset azimuthal angle can be various angles between 0.0° and 180.0°, and in either the clockwise or counterclockwise directions. In some aspects, the second sensor can be the first sensor and the first sensor is coupled to a powered sub that is capable of rotating the first sensor to the appropriate offset azimuthal angle.

In other aspects, the second sensor and the first sensor can be part of the same downhole tool sub, for example, inline probe system 450. In this aspect, the first sensor and second sensor data collection process can occur at the same time. This can be advantageous when the first sensor and the second sensor are pressure probes as each pressure test can take several hours. By combining the first sensor and the second sensor pressure data collection processes, some of the pressure test time can be saved.

In other aspects, there can be more than two sensors. The additional sensors can be oriented at varying offset azimuthal angles thereby improving the quality of the data collected at a cost of the increase in equipment and additional sensor collection time periods. For example, if three sensors are used, they can be oriented at 0°, and 120° in both the clockwise and counterclockwise directions. If four sensors are used, they can be oriented at 0°, 180°, and 90° in both the clockwise and counterclockwise directions. Other offset azimuthal angles can be utilized as well.

Proceeding to a step 930, a permeability tensor can be computed using the data collected from the imaging resistivity sensor and the data collected from the first sensor and second sensor, and, if present, the additional sensors. The data collected can be transformed to use the same coordinate system since the tools used to collect the data can be oriented at different azimuthal angles.

Method 900 proceeds to a step 935 to calculate a porosity anisotropy utilizing the permeability data and permeability tensor, as well as the imaging data. Porosity anisotropy can also utilize the button pad density parameters of resistivity $R_i$ and conductivity $C_i$ in the calculations, in combination with the azimuthal angle α that is parallel to the bed or maximum porosity direction.

Proceeding to a step 940, the permeability tensor can be scaled proportionally to the imaging data as shown in Equation 2 and Equation 3 using the parameters calculated above. The resulting parameters, e.g., permeability tensor, porosity anisotropy, and other reservoir characteristic parameters, can be utilized to define a permeability ellipsoid at the measuring point. The permeability ellipsoid can be visualized as a 2D or 3D ellipsoid overlaid a borehole or the permeability ellipsoid can be a data set that can be analyzed and processed by a computing system. The primary axis of the permeability ellipsoid aligns with the orientation direction of maximum drainage. The secondary axis in the coordinate plane aligns with the orientation direction of minimum drainage. The third axis indicates depth. The drainage characteristics can be used as additional reservoir characteristic parameters and can be utilized to modify the well system operation plan to improve the reservoir production. Method 900 ends at a step 945.

Figure 9B:
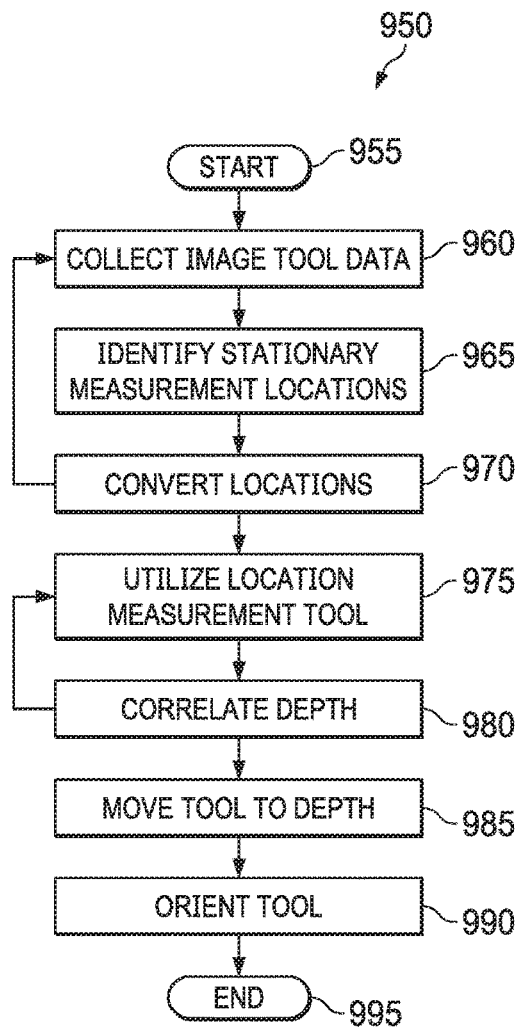
FIG. 9B is an illustration of a flow diagram of an example method to correlate coordinates of a probe system.

FIG. 9B is an illustration of a flow diagram of an example method 950 to correlate coordinates of a probe system. Method 950 can implement the processes as described to determine the direction of maximum and minimum reservoir drainage. Method 950 can be performed, for example, by reservoir characteristic deriver system 1000 of FIG. 10. Method 950 starts at a step 955 and proceeds to a step 960.

In step 960, an imaging resistivity sensor can be utilized to collect subterranean formation data at one or more designated locations within a borehole of a well system. In a step 965, stationary measuring locations, e.g., locations within the borehole, can be identified using the data from the imaging resistivity sensor. The locations can be selected utilizing an analysis of the depths and azimuths on the collected image data, i.e., selecting one or more optimal sets of depth/azimuth parameters.

In a step 970, the locations can be converted from the depth and azimuth parameter pairs to a coordinate system, for example, a geographic coordinate system utilizing the imaging tool. From step 970, method 950 can return to step 960 to collect additional imaging data, if so directed, or proceed to a step 975. In step 975, the measurement tool, e.g., probe, can be utilized to perform the collection of measurements. In a step 980, the depth can be correlated to the coordinate system. In some aspects, this correlation can compensate for cable stretch effects and other influences on the location determination. Proceeding from step 980, method 950 can proceed to step 975 if additional depth locations should be correlated. If the correlation of depths has been completed, method 950 proceeds to a step 985.

In step 985, the one or more tools that include the sensors and probes is moved to each of the determined locations, e.g., wellbore measured depths as determined in step 980. In a step 990, the one or more tools can be azimuthally oriented to approximately align with the determined coordinates, as determined in step 970 and step 980. The collection and processing of the probe measurements can be conducted once the orientation is completed. For example, a pressure probe or a rotary core bit can be utilized as the probe in the one or more tools. Method 950 ends at a step 995.

FIG. 10 is an illustration of a block diagram of an example reservoir characteristic deriver system 1000, which can implement the processes and systems as described herein such as downhole tool 200, oriented probe system 300, and method 900. Reservoir characteristic deriver system 1000 can derive additional reservoir characteristic parameters from collected imaging resistivity sensor data and other sensor data, such as reservoir drainage characteristic parameters.

Reservoir characteristic deriver system 1000 includes a well system 1005, a reservoir characteristic analyzer 1010, a downhole tool system 1020, and a first sensor 1022. In some aspects a user 1015 can be present. In some aspects the first sensor 1022 can be part of a sensor set also including a second sensor 1024, forming a set of one or more sensors. In some aspects, additional sensors can be present in the set of sensors as well. Well system 1005 can include surface equipment to support the well system operations, and can include subsurface, e.g., borehole located, equipment, such as a drill string, a wireline, a cable, a pipe, and a tube.

Located downhole within the borehole is downhole tool system 1020. Downhole tool system 1020, e.g., a permeability tool, can include an imaging resistivity sensor and other sensor types. In other aspects, the imaging resistivity sensor can be part of a separate downhole tool system. Downhole tool system 1020 can include first sensor 1022 and second sensor 1024, such as a pressure probe, an NMR, or a rotary coring bit. First sensor 1022 and second sensor 1024 can be communicatively coupled to a well site controller located as part of well system 1005.

The well site controller can receive the collected data from one or more downhole tools, such as downhole tool system 1020. Reservoir characteristic analyzer 1010 can be a separate computing system or be part of the well site controller. Reservoir characteristic analyzer 1010 can receive the collected data from the well site controller and perform the calculations, computations, and derivations as described herein to produce the reservoir characteristic parameters used by the well system operation plan.

User 1015 can interact with reservoir characteristic analyzer 1010, such as specifying measuring points within the borehole at which the various sensors will be located to collect their respective data. Instructions and operational parameters can be communicated to downhole tool system 1020, first sensor 1022, and second sensor 1024. User 1015 can also receive the results from reservoir characteristic analyzer 1010, such as to perform additional analysis or to take an action using the received results.

Figure 11:
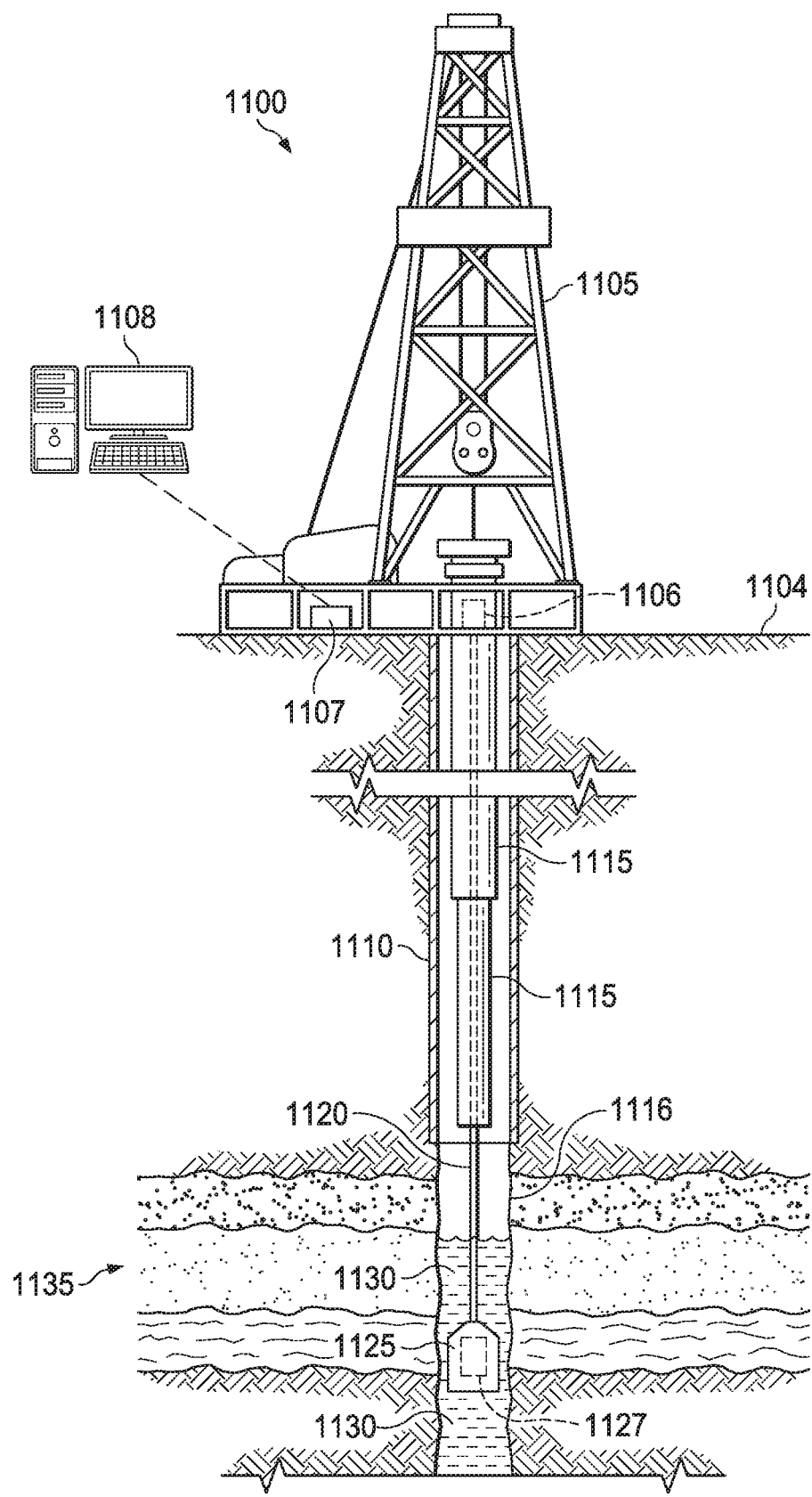
FIG. 11 is an illustration of a diagram of an example well system with a reservoir characteristic analyzer.

FIG. 11 is an illustration of a diagram of an example well system 1100 with a reservoir characteristic analyzer, for example, an extraction system, a production system, a wireline system, and other hydrocarbon well systems. Well system 1100 includes a derrick 1105, a well site controller 1107, a surface pump system 1106, and a computing system 1108. Well site controller 1107 includes a processor and a memory and is operable to direct operation of well system 1100. Derrick 1105 is located at a surface 1104.

Extending below derrick 1105 is a borehole 1110, with two cased sections 1115 and one uncased section 1116. Pipe 1120 is inserted in borehole 1110. Located at the bottom of pipe 1120 is a downhole tool 1125. Downhole tool 1125 can include various downhole tools and bottom hole assemblies (BHA), such as one or more sensors 1127. Other components of downhole tool 1125 can be present, such as a local power supply, or batteries, and capacitors to store power received from another system, as well as a transceiver and a control system. Borehole 1110 is surrounded by subterranean formation 1135 which includes a hydrocarbon reservoir. Connecting surface pump system 1106 and downhole tool 1125 is pipe 1120.

Sensors 1127 can be pressure probes, NMR sensors, rotary coring bits, and other sensor types. In this example, sensors 127 are pressure probes. Fluid 1130 can be pumped into and out of the subterranean formation to generate the pressure test for sensors 1127.

Computing system 1108 or well site controller 1107 can be utilized to perform the operations of the reservoir characteristic analyzer as described herein to derive permeability, porosity, and other characteristic parameters of the reservoir. Computing system 1108 can be proximate well site controller 1107 or be a distance away, such as in a cloud environment, a data center, a lab, or a corporate office. Computing system 1108 can be a laptop, smartphone, PDA, server, desktop computer, cloud computing system, and other computing systems that are operable to perform the process and methods described herein. The information generated from computing system 1108 can be communicated by various conventional means to well site controller 1107 and to well site operators and engineers so reservoir characteristics can be used in modifying the well operation plan of well system 1100.

Figure 12:
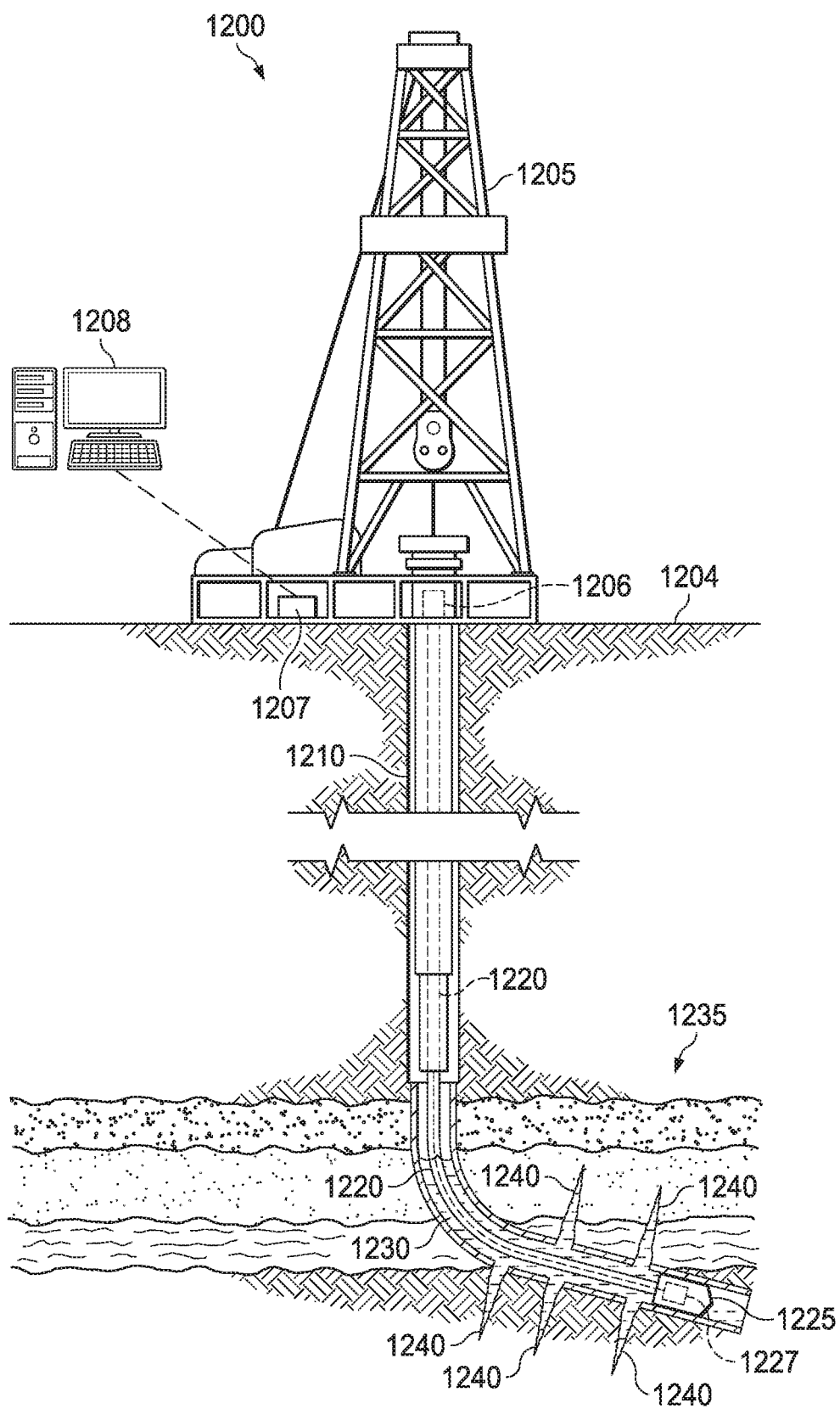
FIG. 12 is an illustration of a diagram of an example hydraulic fracturing well system with a reservoir characteristic analyzer.

FIG. 12 is an illustration of a diagram of an example HF well system 1200 with a reservoir characteristic analyzer, which can be a well site where HF operations are occurring through the implementation of a HF treatment stage plan. HF well system 1200 demonstrates a nearly horizontal wellbore undergoing a fracturing operation.

HF well system 1200 includes surface well equipment 1205 located at a surface 1204, a well site controller 1207, a surface HF pump system 1206, and a computing system 1208. In some aspects, well site controller 1207 is communicatively connected to separate computing system 1208, for example, a separate server, data center, cloud service, tablet, laptop, smartphone, or other types of computing systems capable of executing the processes and methods described herein. Computing system 1208 can be located proximate to well site controller 1207 or located a distance from well site controller 1207. Computing system 1208 and well site controller 1207 can be utilized as the reservoir characteristic analyzer. The output from these systems can be utilized by well site controller 1207 or a well system engineer and operator to modify a well system operation plan of HF well system 1200.

Extending below surface 1204 from surface well equipment 1205 is a wellbore 1210. Wellbore 1210 can have zero or more cased sections and a bottom section that is uncased. Inserted into wellbore 1210 is a fluid pipe 1220. The bottom portion of fluid pipe 1220 has the capability of releasing downhole material 1230, such as carrier fluid with diverter material, from fluid pipe 1220 to subterranean formations 1235 containing fractures 1240. The release of downhole material 1230 can be by perforations in the casing, by valves placed along fluid pipe 1220, or by other release means. At the end of fluid pipe 1220 is an end of pipe assembly 1225, which can be one or more downhole tools or an end cap assembly.

End of pipe assembly 1225 can include sensors 1227, such as pressure probes, NMR sensors, and rotary coring bits that can be used to collect reservoir data that is communicated to well site controller 1207 or computing system 1208. The resulting reservoir characteristic parameters can be used to guide the operators in modifying fractures 1240 to improve the reservoir drainage efficiency.

Figure 13:
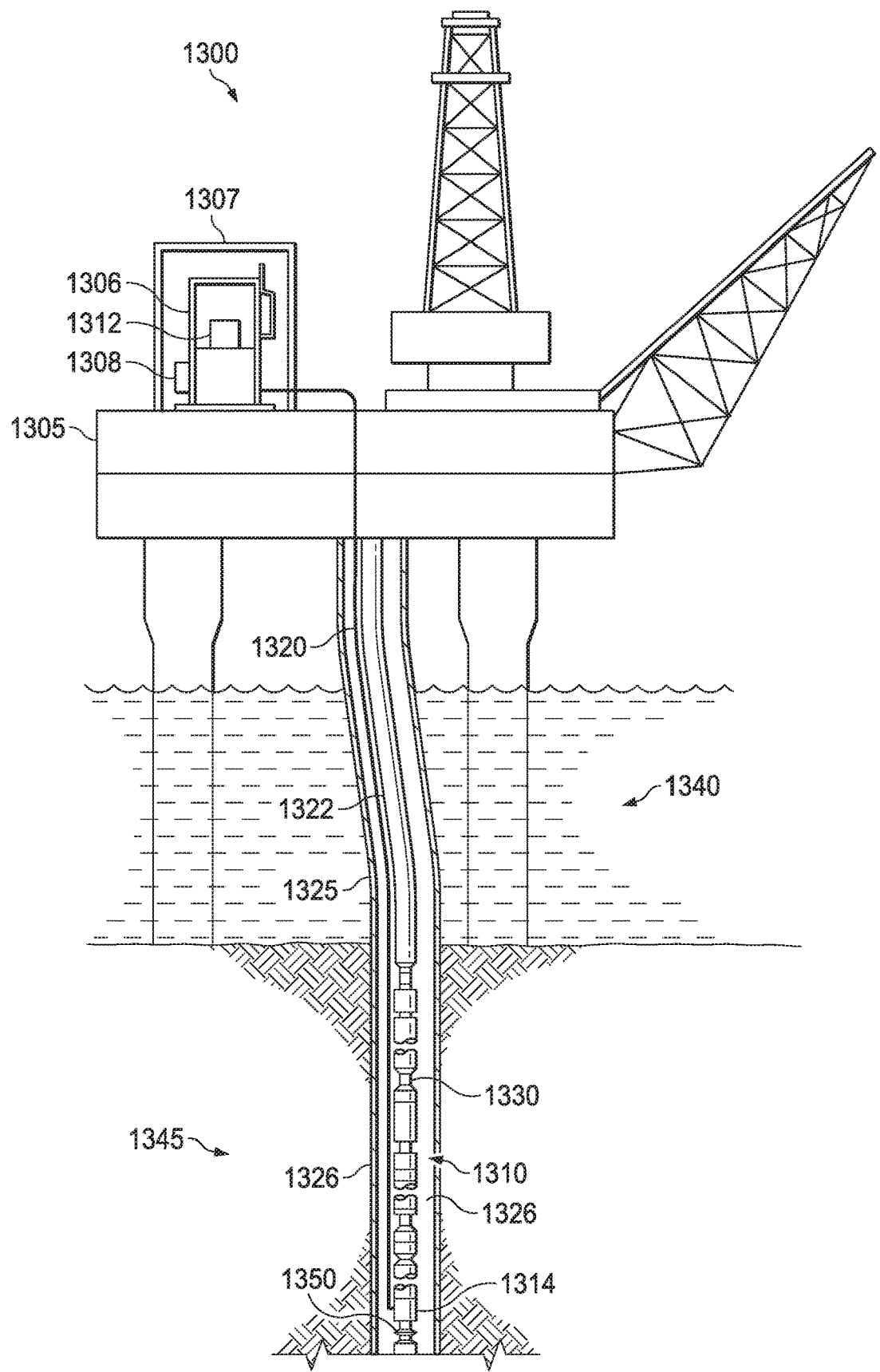
FIG. 13 is an illustration of a diagram of an example pump system in an offshore well utilizing a reservoir characteristic analyzer.

FIG. 13 is an illustration of a diagram of an example pump system in an offshore well 1300 utilizing a reservoir characteristic analyzer, where an ESP assembly 1310 is placed downhole in a borehole 1326 below a body of water 1340, such as an ocean or sea. Borehole 1326 is surrounded by subterranean formation 1345 which includes the reservoir. ESP assembly 1310 can also be used for onshore operations. ESP assembly 1310 includes a speed controller 1312, an ESP motor 1314, and an ESP pump 1330.

Speed controller 1312 is placed in a cabinet 1306 inside a control room 1307 on an offshore platform 1305, such as an oil rig. Speed controller 1312 is operable to adjust the RPM of ESP motor 1314 to improve well productivity. In the illustrated aspect, ESP motor 1314 is a two-pole, three-phase squirrel cage induction motor that operates to turn ESP pump 1330. ESP motor 1314 is located near the bottom of ESP assembly 1310, just above downhole sensors 1350 within borehole 1326. A power cable 1320 extends from speed controller 1312 to ESP motor 1314 and to the other components downhole.

ESP pump 1330 can be a multi-stage centrifugal pump including an impeller and a diffuser at each stage. ESP pump 1330 should be sized and selected to enable efficient pumping of fluid of interest, such as oil or other hydrocarbons, through production tubing 1322 to storage tanks onboard the offshore platform 1305.

In some embodiments, ESP pump 1330 can be a horizontal surface pump, a progressive cavity pump, or an electric submersible progressive cavity pump. A motor seal section and intake section may extend between ESP motor 1314 and ESP pump 1330. A riser 1325 can separate ESP assembly 1310 from water 1340. Perforations in the well casing can allow the fluid of interest from the reservoir of subterranean formation 1345 to enter borehole 1326.

Downhole sensors 1350 can be sensors that can collect data on the reservoir contained within subterranean formation 1345. The collected data can be communicated to computing system 1308 to perform the reservoir characteristic analysis and to provide the resulting information to a well operator or engineer, or to a well site controller, to modify the well site operation plan.

FIGS. 11 and 12 depict onshore operations. Those skilled in the art will understand that the disclosure is equally well suited for use in offshore operations. FIGS. 11, 12, and 13 depict specific borehole configurations, those skilled in the art will understand that the disclosure is equally well suited for use in boreholes having other orientations including vertical boreholes, horizontal boreholes, slanted boreholes, multilateral boreholes, and other borehole types.

A portion of the above-described apparatus, systems, or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field-programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of aspects as described in the SUMMARY section can have one or more of the following additional elements in combination. Element 1: wherein the second azimuthal angle is offset from the first azimuthal angle by 90°. Element 2: wherein the first sensor and the second sensor are integrated into a same sensor. Element 3: further comprising a motorized sub, coupled to the first tool and capable of orienting the first tool to the second azimuthal angle. Element 4: further comprising additional tools, mechanically, electrically, and communicatively coupled to one of the downhole tool assembly, the first tool, or the second tool, wherein each coupled tool in the additional tools includes a tool sensor offset at a different azimuthal angle from the first azimuthal angle. Element 5: further comprising an orienting wheel system, coupled to the downhole tool assembly and capable of orienting the first sensor to a high side of the borehole. Element 6: wherein the directional tool is capable of rotating the permeability tool to one or more azimuthal angles. Element 7: wherein the permeability tool utilizes one or more sensors, and the sensors are one of a pressure probe, a nuclear magnetic resonance sensor, and a rotary coring bit. Element 8: wherein the one or more sensors are oriented at different azimuthal angles. Element 9: wherein the permeability tool is operable to communicate the permeability parameters to a reservoir characteristic analyzer. Element 10: where the reservoir characteristic analyzer computes one or more reservoir characteristic parameters using the permeability parameters. Element 11: wherein the directional tool utilizes an orienting wheel system to orient the permeability tool to a high side of the borehole. Element 12: further comprising generating a reservoir drainage parameter utilizing the permeability tensor. Element 13: wherein the reservoir drainage parameter indicates an axis of maximum and minimum reservoir drainage. Element 14: modifying a well system operation plan utilizing the reservoir drainage parameter. Element 15: further comprising transforming the first orientation and the second orientation to an orientation utilized by the imaging resistivity sensor utilizing an azimuthal angle of the first sensor or the second sensor. Element 16: wherein the second sensor is the first sensor, and where a motorized sub is utilized to orient the first sensor to the second orientation. Element 17: wherein the second orientation is azimuthally offset 90.0° from the first orientation. Element 18: wherein the first sensor data and the second sensor data is one of pressure probe parameters, nuclear magnetic resonance parameters, or rotary coring bit parameters. Element 19: wherein the first sensor data includes a permeability parameter, a mobility parameter, and a pressure parameter. Element 20: wherein there are two or more measuring points determined and a corresponding reservoir drainage parameter is generated for each measuring point in the two or more measuring points. Element 21: wherein a permeability maximum parameter and a permeability transverse parameter are calculated, and the scaling the permeability tensor utilizes a scaling factor. Element 22: wherein the calculating the porosity anisotropy utilizes a button pad density parameter, and the button pad density parameter is measured at a maximum permeability level as indicated by the first sensor and the second sensor. Element 23: wherein the button pad density parameter utilizes one of a resistivity parameter or a conductivity parameter, and wherein the imaging resistivity sensor is configured for water-based mud and the button pad density parameter utilizes the conductivity parameter. Element 24: the imaging resistivity sensor is configured for oil-based mud and the button pad density parameter utilizes the resistivity parameter. Element 25: wherein the determining a measuring point further comprises identifying one or more stationary measurement locations. Element 26: wherein the determining a measuring point further comprises converting the one or more stationary measurement locations to a coordinate system from one or more depth and azimuth parameter pairs. Element 27: wherein the determining a measuring point further comprises correlating a wellbore measured depth to the one or more stationary measurement locations utilizing the coordinate system. Element 28: wherein the determining a measuring point further comprises moving at least one of the first sensor or the second sensor to the one or more stationary measurement locations. Element 29: wherein the determining a measuring point further comprises orienting at least one of the first sensor or the second sensor to one or more coordinates of the one or more stationary measurement locations. Element 30: further comprising a controller, capable of receiving an output from the reservoir characteristic analyzer and directing operations of the well system. Element 31: further comprising a second sensor, in the set of one or more sensors, capable to collect second sensor data of the reservoir after the downhole tool has moved the second sensor to the first sensor location, and wherein the second sensor is orientated at an offset azimuthal angle to the first sensor, and the reservoir characteristic analyzer utilizes the second sensor data. Element 32: wherein the downhole tool utilizes a powered sub to orient the first sensor to more than one azimuthal angle. Element 33: wherein the downhole tool utilizes an orientating wheel system to orient the first sensor toward a high side of the borehole.

What is claimed is:

1. An apparatus, comprising:
   a downhole tool assembly, capable of supporting one or more tools, supplying power to the tools, and providing communications between the tools and surface equipment, wherein the downhole tool assembly is utilized within a borehole of a well system;
   a first tool, mechanically, electrically, and communicatively coupled to the downhole tool assembly, wherein the first tool includes a first sensor oriented at a first azimuthal angle; and
   a second tool, mechanically, electrically, and communicatively coupled to the first tool or to the downhole tool assembly, wherein the second tool includes a second sensor and the second sensor is oriented at a second azimuthal angle, and wherein the first sensor and the second sensor can measure one or more characteristics of a reservoir, and the downhole tool assembly derives a porosity anisotropy using the one or more characteristics.

2. The apparatus as recited in claim 1, wherein the second azimuthal angle is offset from the first azimuthal angle by 90°.

3. The apparatus as recited in claim 1, wherein the first sensor and the second sensor are one sensor, further comprising:
   a motorized sub, coupled to the first tool and capable of orienting the first tool to the second azimuthal angle.

4. The apparatus as recited in claim 1, further comprising:
   additional tools, mechanically, electrically, and communicatively coupled to one of the downhole tool assembly, the first tool, or the second tool, wherein each coupled tool in the additional tools includes a tool sensor offset at a different azimuthal angle from the first azimuthal angle.

5. The apparatus as recited in claim 1, further comprising:
   an orienting wheel system, coupled to the downhole tool assembly and capable of orienting the first sensor to a high side of the borehole.

6. A downhole assembly, comprising:
   a permeability tool, operable to obtain permeability parameters of a borehole of a well system from at least two different azimuthal angles with respect to an orientation of the permeability tool, and operable to derive a porosity anisotropy using the permeability parameters; and
   a directional tool, operable to indicate the orientation of the permeability tool.

7. The downhole assembly as recited in claim 6, wherein the directional tool is capable of rotating the permeability tool to one or more azimuthal angles.

8. The downhole assembly as recited in claim 6, wherein the permeability tool utilizes two or more sensors, and the sensors are one of a pressure probe, a nuclear magnetic resonance sensor, and a rotary coring bit, wherein the two or more sensors are oriented at different azimuthal angles.

9. The downhole assembly as recited in claim 6, wherein the permeability tool is operable to communicate the permeability parameters to a reservoir characteristic analyzer, and where the reservoir characteristic analyzer computes one or more reservoir characteristic parameters using the permeability parameters.

10. The downhole assembly as recited in claim 6, wherein the directional tool utilizes an orienting wheel system to orient the permeability tool to a high side of the borehole.

11. A method to determine reservoir characteristic parameters, comprising:
   collecting imaging data utilizing an imaging resistivity sensor located within a borehole of a well system;
   determining a measuring point along the borehole utilizing the imaging data;
   positioning a first sensor at a first orientation at the measuring point and collecting first sensor data;
   moving a second sensor at a second orientation to the measuring point and collecting second sensor data;
   computing a permeability tensor utilizing the first sensor data, the second sensor data, and the imaging data;
   calculating a porosity anisotropy utilizing the permeability tensor, the first sensor data, the second sensor data, and the imaging data; and
   scaling the permeability tensor utilizing the porosity anisotropy oriented to a maximum fracture porosity, wherein the permeability tensor, the porosity anisotropy, the imaging data, the first sensor data, and the second sensor data are the reservoir characteristic parameters.

12. The method as recited in claim 11, further comprising:
   generating a reservoir drainage parameter utilizing the permeability tensor, wherein the reservoir drainage parameter indicates an axis of maximum and minimum reservoir drainage; and
   modifying a well system operation plan utilizing the reservoir drainage parameter.

13. The method as recited in claim 11, further comprising:
   transforming the first orientation and the second orientation to an orientation utilized by the imaging resistivity sensor utilizing an azimuthal angle of the first sensor or the second sensor.

14. The method as recited in claim 11, wherein the second sensor is located at the first sensor, and where a motorized sub is utilized to orient the second sensor to the second orientation.

15. The method as recited in claim 11, wherein the second orientation is azimuthally offset 90.0o from the first orientation.

16. The method as recited in claim 11, wherein the first sensor data and the second sensor data use the same type of collected data, wherein the type of collected data is one of pressure probe parameters, nuclear magnetic resonance parameters, or rotary coring bit parameters, wherein the first sensor data includes a permeability parameter, a mobility parameter, and a pressure parameter.

17. The method as recited in claim 11, wherein there are two or more measuring points determined and a corresponding reservoir drainage parameter is generated for each measuring point in the two or more measuring points.

18. The method as recited in claim 11, wherein a permeability maximum parameter and a permeability transverse parameter are calculated, and the scaling the permeability tensor utilizes a scaling factor.

19. The method as recited in claim 11, wherein the calculating the porosity anisotropy utilizes a button pad density parameter, and the button pad density parameter is measured at a maximum permeability level as indicated by the first sensor and the second sensor, wherein the button pad density parameter utilizes one of a resistivity parameter or a conductivity parameter, and wherein the imaging resistivity sensor is configured for water-based mud and the button pad density parameter utilizes the conductivity parameter, or the imaging resistivity sensor is configured for oil-based mud and the button pad density parameter utilizes the resistivity parameter.

20. The method as recited in claim 11, wherein the determining a measuring point further comprises:
   identifying one or more stationary measurement locations using the imaging data;
   converting the one or more stationary measurement locations to a coordinate system from one or more depth and azimuth parameter pairs;
   correlating a wellbore measured depth to the one or more stationary measurement locations utilizing the coordinate system;
   moving at least one of the first sensor or the second sensor to the one or more stationary measurement locations; and
   orienting at least one of the first sensor or the second sensor to one or more coordinates of the one or more stationary measurement locations, wherein each stationary measurement location in the one or more stationary locations is used as the measuring point for a respective iteration of the positioning, moving, computing, calculating, and scaling.

21. A system, comprising:
   a downhole tool, located in a borehole of a well system, capable of mechanically, electrically, and communicatively supporting a set of one or more sensors;
   a first sensor, in the set of one or more sensors, capable to collect first sensor data of a reservoir at a first sensor location; and
   a reservoir characteristic analyzer, capable of sending instructions and parameters to the downhole tool and the set of one or more sensors, receiving the first sensor data, computing a permeability tensor, calculating a porosity anisotropy, scaling the permeability tensor, and generating a reservoir drainage parameter, wherein the reservoir drainage parameter includes an axis of maximum reservoir drainage and an axis of minimum reservoir drainage, and where the porosity anisotropy is derived using the permeability tensor.

22. The system as recited in claim 21, further comprising:
   a controller, capable of receiving an output from the reservoir characteristic analyzer and directing operations of the well system.

23. The system as recited in claim 21, further comprising:
   a second sensor, in the set of one or more sensors, capable to collect second sensor data of the reservoir after the downhole tool has moved the second sensor to the first sensor location, and wherein the second sensor is orientated at an offset azimuthal angle to the first sensor, and the reservoir characteristic analyzer utilizes the second sensor data.

24. The system as recited in claim 21, wherein the downhole tool utilizes a powered sub to orient the first sensor to more than one azimuthal angle.

25. The system as recited in claim 21, wherein the downhole tool utilizes an orientating wheel system to orient the first sensor toward a high side of the borehole.

\* \* \* \* \*